March 18, 1930.　　　E. L. JACOBY　　　1,751,088
CONVERTIBLE SEAT FOR AUTOMOTIVE VEHICLES
Filed Dec. 5, 1927　　　2 Sheets-Sheet 1
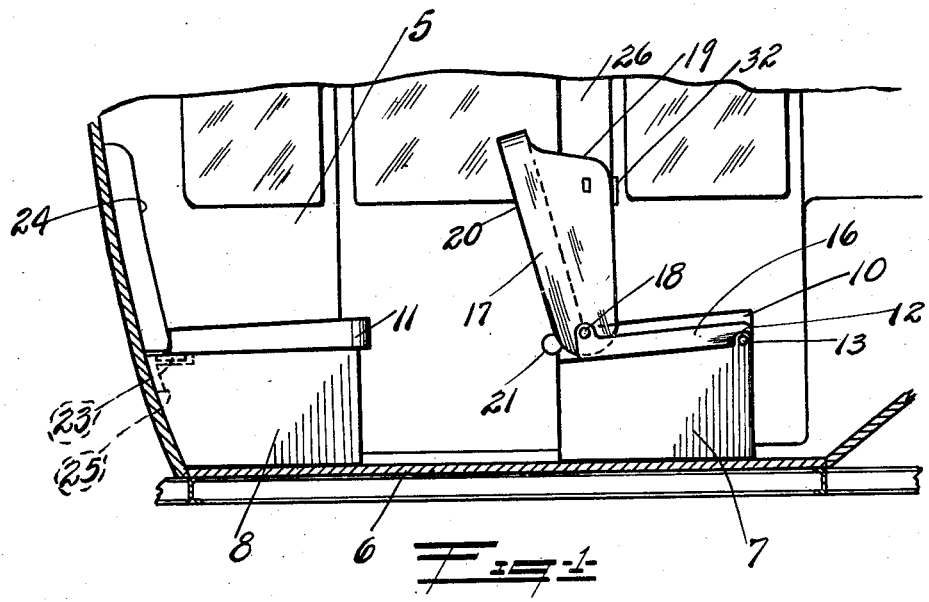
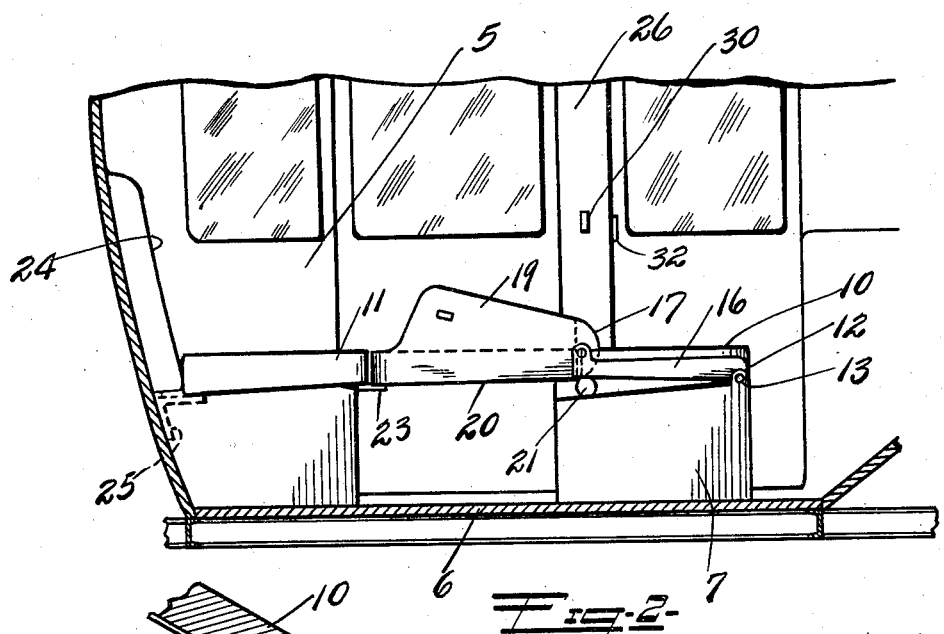
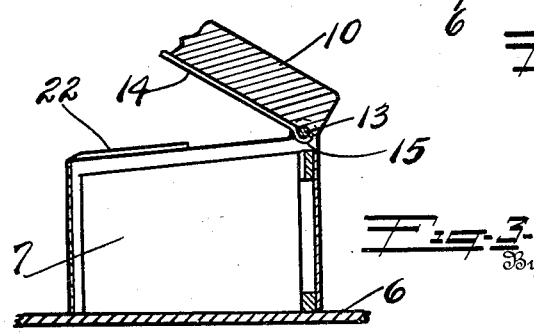
Inventor
Edward L. Jacoby.
By Frank C. Karman.
Attorney March 18, 1930.  E. L. JACOBY  1,751,088
CONVERTIBLE SEAT FOR AUTOMOTIVE VEHICLES
Filed Dec. 5, 1927  2 Sheets-Sheet 2
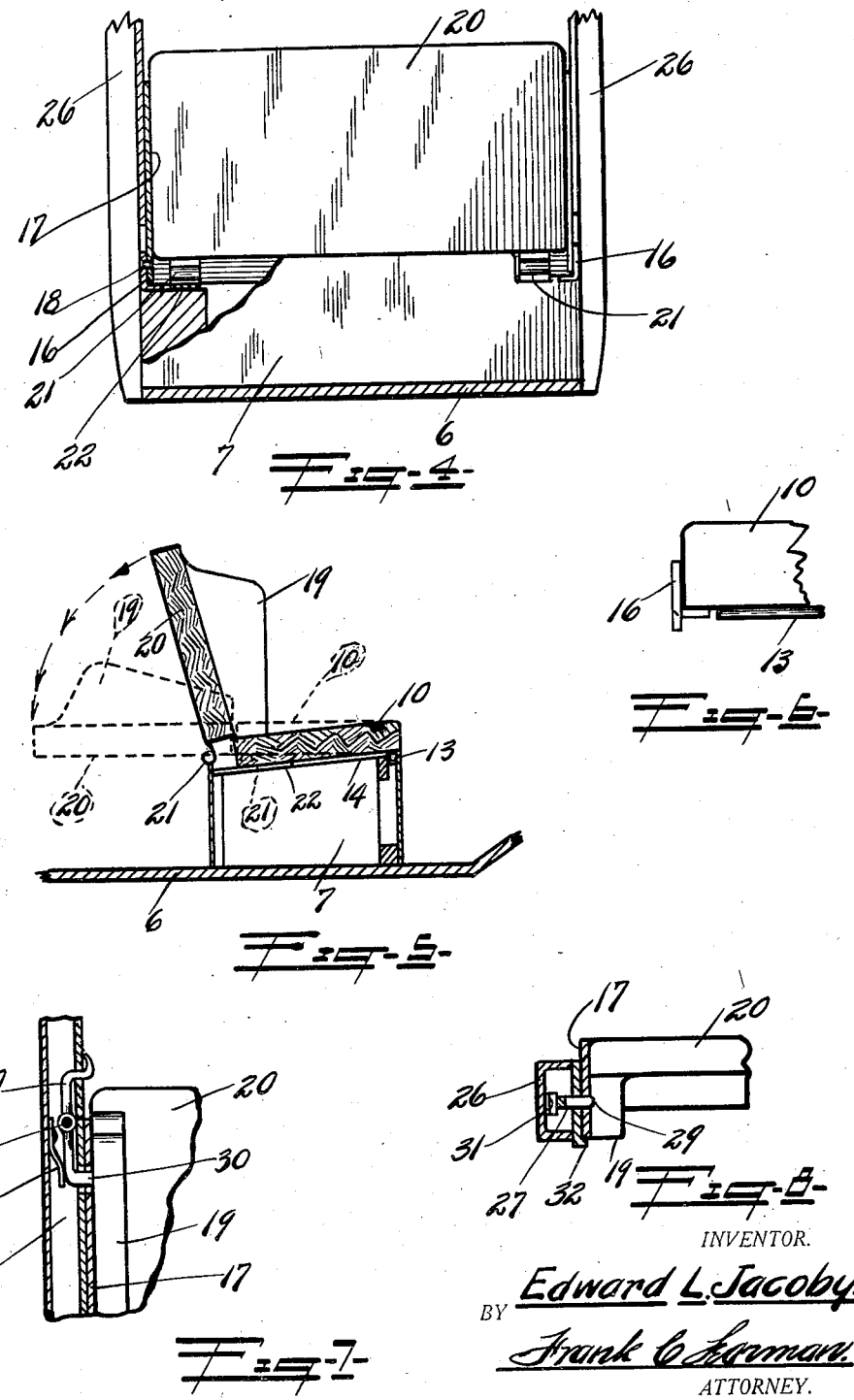
INVENTOR.
Edward L. Jacoby
BY Frank C. Forman
ATTORNEY.

Patented Mar. 18, 1930

1,751,088

UNITED STATES PATENT OFFICE

EDWARD L. JACOBY, OF GAYLORD, MICHIGAN

CONVERTIBLE SEAT FOR AUTOMOTIVE VEHICLES

Application filed December 5, 1927. Serial No. 237,659.

My invention relates to automotive vehicles and particularly to the seat construction thereof.

The prime object of the invention is to provide a neat and comfortable seat structure, which can be readily and quickly adjusted to form a bed, which will be perfectly level, and provide a convenient and comfortable bed for the occupants of the vehicle.

Another object is to provide simple, and substantial means for adjusting the seat, said seats being so constructed that they can be readily adjusted, or bodily removed from the vehicle and used as a seat or table at a convenient spot for the accommodation of food and refreshments.

A further object is to provide a seat structure which has the general appearance of a stationary seat, which is very easy to operate, and economical to manufacture and install.

The above and other objects will appear as the specification progresses, reference being had to the accompanying drawings in which I have shown the preferred embodiment of my invention, and in which like reference numerals indicate like parts throughout the several views thereof.

In the drawings—

Fig. 1. is a fragmentary longitudinal sectional view of a vehicle body embodying my invention.

Fig. 2. is a view similar to Fig. 1. the seats being arranged to form a bed.

Fig. 3. is a fragmentary sectional view of the front seat frame illustrating the removal of the seat cushion proper.

Fig. 4. is a transverse sectional view of the vehicle body looking towards the back of the front seat.

Fig. 5. is a longitudinal sectional view of the front seat, the dotted lines showing it shifted to position to form a bed.

Fig. 6. is a fragmentary front view of the front seat and showing the manner of mounting.

Fig. 7. is a fragmentary sectional elevation illustrating a latching mechanism.

Fig. 8. is a fragmentary plan view thereof.

Referring now particularly to the drawings, the numeral 5 designates the upper portion of the frame of an automobile, this is provided with the usual floor 6 to which the front and rear seat frames 7 and 8 respectively are secured, the top rail of each seat frame being preferably set at an angle, so that the occupants may be comfortable, and the cushions 10 and 11 are placed thereon in a manner to be presently described.

Ears 12 are formed integral with the side walls of the front seat frame, and form bearings for a transversely disposed rod 13 to which the front cushion 10 is removably secured, straps 14 being secured to the under side of the seat cushion, the front end of each strap being bent down and curved as shown at 15, to detachably engage said rod.

Spaced apart angle shaped side members 16 are also pivotally secured to the rod 13, extending rearwardly and are pivotally secured to plate members 17 by means of a countersunk rivet 18, said plate being secured to the wings 19 of the back frame 20, so that the back 20 may be swung down to form a bed.

Inasmuch as the seat cushions normally set at an angle, it is necessary (when the structure is used as a bed), to raise the back end thereof to level position, I therefore secure two or more cam members 21 to the back frame of the seat in any approved manner, and provide plates 22 on the face of the seat frame for engagement by said cams, so that when the back is swung down to horizontal position, these cams will engage said plates and raise the rear end of the seat cushion level, and support it in such position. The cams can be in the form of a roller, or a strip of band iron can be secured to the back frame and the one end rolled to shape.

The seat frames are hollow and the interior thereof can of course be used as trunks for clothes and necessary articles of all kinds, the front cushion being removable by swinging the rear end upwardly as shown in Fig. 3, to permit the strap members 14 being unhooked from the rod 13.

The rear seat cushion is also placed at an angle when used as a seat, and the back end of the cushion is usually somewhat thicker than the front, consequently, when the vehicle is used as a bed, I merely turn the cushion end for end, so that the thin edge faces the front, this together with the angle of the seat frame brings the cushion level. Lugs 23 are also secured to the thin edge of the cushion, and project as shown, so that when the cushion is reversed, these lugs serve to support the end of the back of the front seat, and when the cushion is in its regular position, these lugs are concealed in under the back rest or cushion 24, which is rigidly secured to the rear wall of the vehicle, brackets 25 serving as a support for the cushion.

The front seat can be locked in upright position in any approved manner, but I prefer to secure it to one of the jamb members 26, a latch 27 being pivotally mounted in the jamb at 28 and a latch tongue 29 is provided on the lower end thereof, and engages a suitable opening 30 provided in the side plate 17, a spring member 31 being secured to the jamb and provides a spring tension at all times, to force the tongue into the opening 30, the tongue being leveled as shown to form a pilot and to facilitate the latch entering the pocket in the side plate, a lip 32 being provided on the plate 17 and acts as a stop when the seat is swung upright.

It will of course be understood that the cams 21 and rod 13 will be covered by suitable material so as to be concealed from view, and that the general design of seats will be in accord with the vehicle in which they are used.

From the foregoing description it will be obvious that I have perfected a very simple, comfortable, and economical seat construction for automobiles.

What I claim is:—

1. The combination with a vehicle body, of a seat support, a seat frame pivotally connected to the front of said support, a seat cushion detachably mounted therein, a back frame pivotally connected to the rear end of the pivoted seat frame, cams mounted on said back frame and adapted to engage the seat when the back is swung down, and means on the body for rigidly and detachably engaging the back frame when it is swung to upright position.

2. The combination with a vehicle body, of a hollow seat support, a transversely disposed rod mounted thereon, a seat frame pivotally connected thereto and having a cushion mounted therein and detachably engaging said rod, a back frame pivotally connected to the rear end of the pivoted seat frame, and cams on the back frame adapted to engage the seat support for simultaneously raising the back of the seat frame as the back frame is swung down.

3. The combination with a vehicle body, front and rear hollow seat supports, cushions removably mounted thereon, a seat frame pivotally connected to the front seat support, a back frame pivotally connected to the rear end of the pivoted seat frame, means on the back frame adapted to engage and ride on the seat support for simultaneously raising the back of the seat frame as the back frame is swung down, and means on the vehicle body for detachably engaging the seat frame when it is swung up to raised position.

In testimony whereof I hereunto affix my signature.

EDWARD L. JACOBY.